July 23, 1929.  B. M. SCHAUMAN ET AL  1,721,605
AUTOMATIC CONTROL MEANS FOR MOTOR VEHICLES
Filed Sept. 16, 1926    2 Sheets-Sheet 1
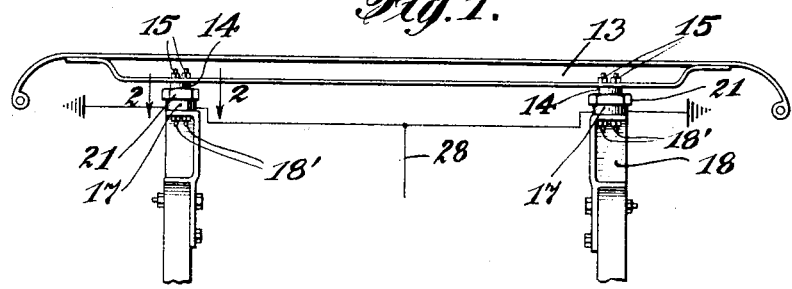
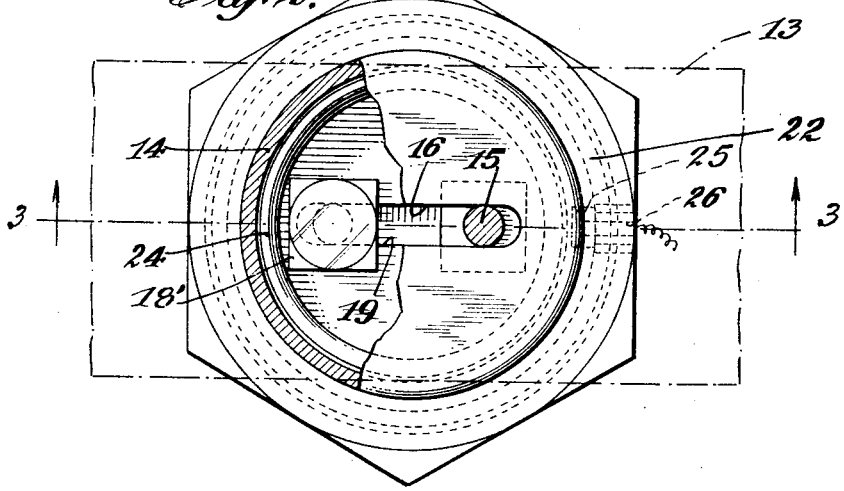
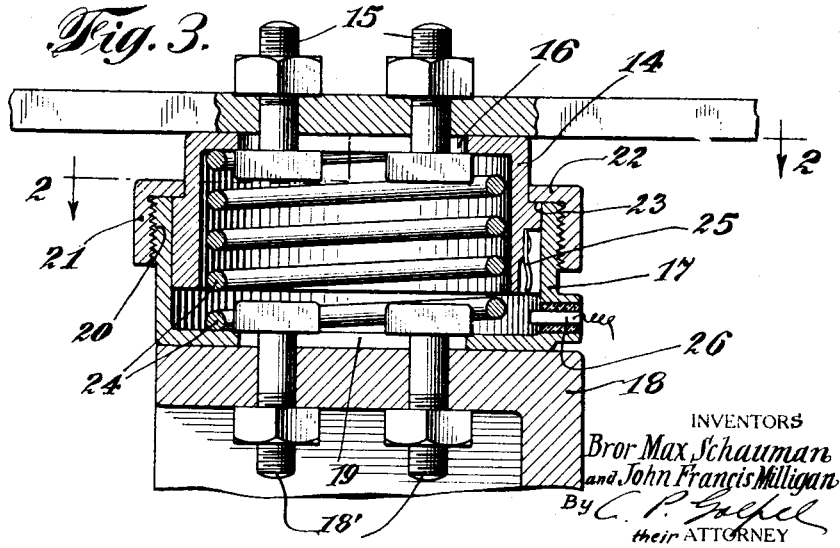
INVENTORS
Bror Max Schauman
and John Francis Milligan
By C. P. Goepel
their ATTORNEY

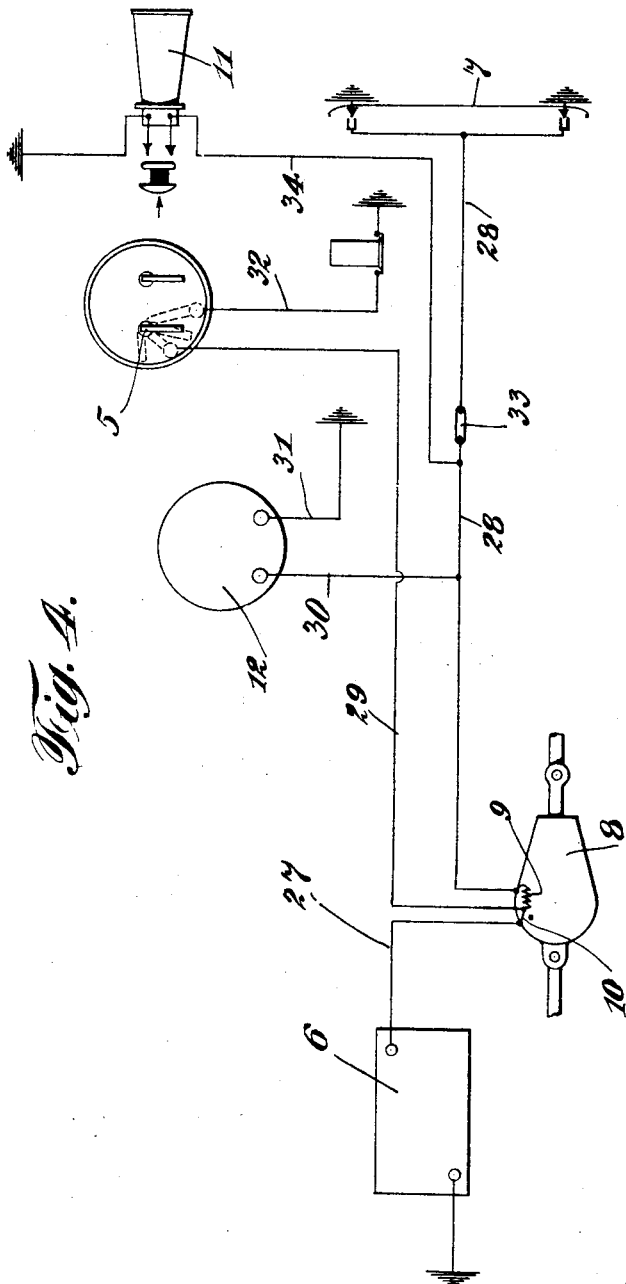

Patented July 23, 1929.

1,721,605

UNITED STATES PATENT OFFICE.

BROR MAX SCHAUMAN, OF ATLANTIC HIGHLANDS, AND JOHN FRANCIS MILLIGAN, OF RIDGEFIELD PARK, NEW JERSEY, ASSIGNORS, BY MESNE ASSIGNMENTS, TO AUTOMATIC CAR STOP CORPORATION, A CORPORATION OF DELAWARE.

AUTOMATIC CONTROL MEANS FOR MOTOR VEHICLES.

Application filed September 16, 1926. Serial No. 135,734.

This invention relates to automatic control means for motor vehicles, and has for its primary object and purpose to provide means rendered effective by impact with the bumper of the vehicle in the event of a collision for automatically applying the wheel brakes and disconnecting the ignition circuit from the battery so that the vehicle will be quickly brought to a stop. We also provide a manually operable means for producing the same result independently of the bumper should other emergency arise.

More particularly, we propose to provide an electrical circuit controlling the operation of an emergency brake applying means of the character disclosed in the pending application of Bror Max Schauman, filed August 14, 1926, Serial No. 129,123, and said circuit being automatically closed through the medium of a suitable switch upon impact with the bumper. One side of the ignition switch is also connected in this control circuit for the brake operating means whereby when the brakes are applied the ignition circuit will be broken, and a separate manually operable switch is also connected in said brake control circuit whereby the circuit may be closed independently of the bumper. In addition, there is also interposed in the brake control circuit, a cut-out switch to disconnect the circuit from the bumper switch, as when the vehicle is being driven through heavy snowdrifts or underbrush which might produce sufficient resistance to close the bumper switch, and one side of the horn circuit is also connected in the brake control circuit so that the horn will be sounded when the latter circuit is closed.

With the above and other objects in view, the invention consists in the improved automatic control means for motor vehicles and in the form, construction and relative arrangement of the several parts thereof as will be hereinafter more fully described, illustrated in the accompanying drawings, and subsequently incorporated in the subjoined claims.

In the drawings, wherein similar reference characters designate corresponding parts throughout the several views, and in which we have shown one practical embodiment of our present improvements,—

Figure 1 is a plan view of a motor vehicle bumper illustrating the manner of mounting the same in connection with the circuit closing switch;

Fig. 2 is a sectional view taken on the line 2—2 of Fig. 1;

Fig. 3 is a sectional view taken on the line 3—3 of Fig. 2, and

Fig. 4 is a diagrammatic view illustrating the control circuit.

Our present improvements are adapted to be applied to a motor vehicle having standard equipment, and in Fig. 4 of the drawings we have diagrammatically illustrated the ignition switch at 5, the current supply battery at 6 and the front bumper at 7. The emergency brake applying means as disclosed in the pending patent application above referred to is generally indicated at 8 and includes a latch operating solenoid 9 and a normally closed switch 10. The motor vehicle horn is indicated at 11, while 12 designates a push button or other suitable type of manually operable switch which may be conveniently mounted upon the steering post or instrument board of the motor vehicle.

Referring to Figs. 1, 2 and 3 of the drawings, wherein we have shown one form of bumper actuated switch, the bumper 13 may be of any approved type and adjacent its opposite ends is rigidly fixed to the hollow cylindrical members 14, as by means of the bolts 15 engaged through suitable openings in the bumper bar and through a slot 16 provided in the end wall of the member 14. Each member 14 is slidably engaged in the hollow cylindrical member 17 which is similarly attached to a suitable bracket 18 fixed to the forward end of one of the side frames of the vehicle by means of bolt 18' engaged through the slot 19 in the end wall of said member. This member 17 is provided with external threads 20 upon its wall to receive an internally threaded cap 21 having an annular flange 22 extending inwardly and adapted to be engaged by the annular stop shoulder 23 formed on the wall of the member 14. This member is normally projected outwardly and the shoulder 23 yeldingly held in bearing contact by the flange 22 by a suitable coil spring 24 housed within the members 14 and 17. The member 14 carries a switch contact 25 which is grounded through said member and the vehicle frame and is adapted to engage a contact member 26 mounted in the wall of the member 17 and suitably insulated therefrom.

Referring again to Fig. 4 of the drawings, one terminal of the battery 6 is connected by wire 27 to one side of the switch 10. One winding of the solenoid 9 is connected by wire 28 to the bumper switch contacts 26 and a wire 29 connects the other side of the switch 10 to which the other solenoid winding is connected to one pole of the present ignition switch, said wire corresponding to the usual connection between the switch and the battery. One pole of the manually operable switch 12 is connected by a wire 30 with the wire 28, the other pole of said switch being connected to a suitable ground by wire 31. The other pole of the ignition switch 5 is connected by wire 32 to the ignition coil and hence to the ground in the usual manner.

In the line 28 a suitable type of one-way switch 33 is interposed, said switch being normally closed. This switch, however, may be readily moved to open position to break the circuit connection with the bumper switches, in case of accident or when the car is travelling through deep snow or thick underbrush which might offer sufficient resistance to cause the operation of the bumper switches. If desired in connection with the manually operable switch 33, a suitable signal such as a lamp bulb can be provided in the circuit so that the bulb will be lighted when this switch is open, thus indicating to the operator that the circuit for controlling the operation of the emergency brake applying mechanism is disconnected or broken.

A wire 34 also connects the ground side of the circuit with the horn 11 by wire 28 between switch 33 and the brake applying mechanism 8 so that when the circuit is closed by the bumper switch, the horn will at the same time be operated.

From the above description, it will be apparent that by the provision of the two bumper switches, upon impact against said bumper at any point along its length, as in the event of a collision, one or the other of said switches will be closed, the member 14 being moved inwardly relative to the member 17 so as to engage the grounded contact 25 with the switch contact 26, thereby closing the circuit through wire 28 and switch 10 to the battery 6, energizing solenoid 9 and thereby effecting the operation of the mechanism 8 to apply the wheel brakes. By so doing, the switch 10 is opened, thus breaking the circuit connection with the battery 6 and thereby disconnecting the ignition switch 5 from said battery, thus stopping the further operation of the motor. Therefore, the vehicle will be brought to a full stop in the shortest possible length of time after the collision impact is received by the bumper. In the event other emergency should arise, the operator may at any time close the circuit independently of the bumper switch by operating the button or other manual switch 12, whereupon the circuit will of course be closed through the wire 30 connected with wire 28 and the ground connection 31. Simultaneously with this closing of the circuit and the application of the brakes the horn 11 is also operated through the connection 34.

From the above description, it will be apparent that we have devised a very simple controlling circuit for the automatic brake applying mechanism of the pending application above referred to, whereby the speed of the vehicle will be quickly checked, independently of any action on the part of the operator in the event of a collision, or on the other hand, whereby the vehicle may be quickly stopped in cases of emergency and the supply of motive power cut off by simply closing a switch. It is evident that the invention can be readily applied to various standard makes of motor vehicles. We have herein referred to one type of bumper operated switch which may be advantageously used, but it will be apparent that in this respect our improvements are susceptible of considerable modification, and various other switch constructions might be provided. Also, the several other essential features of our present disclosure might be variously modified as the necessities of the particular application thereof might require. It is accordingly to be understood that we reserve the privilege of resorting to all such legitimate alternative constructions as may fairly be incorporated within the spirit and scope of the invention as claimed.

We claim:

1. In combination with a motor vehicle having standard equipment including a bumper, an ignition switch and circuit therefor, brake applying means and electrically operable means controlling the effective operation of the brake applying means independently of the brake lever, and a circuit for said electrical control means including a switch actuated by impact with the bumper to close said circuit and thereby effect the operation of said brake applying means, a normally closed switch in said circuit and a connection between one side of said switch and one pole of the ignition switch, said normally closed switch being opened upon the operation of said brake applying means, and thereby breaking the ignition circuit, a manually operable switch connected in said circuit to close the circuit independently of the bumper actuated switch, and a second normally closed switch interposed in said circuit between the connections with said manually operable switch and the bumper switch and adapted to be opened to cut the bumper actuated switch out of the circuit.

2. In combination with a motor vehicle having standard equipment including a bumper, an ignition switch and circuit therefor, brake applying means and electrically operable means controlling the effective operation of the brake applying means independently of the brake lever, and a circuit for said electrical control means including a switch actuated by impact with the bumper to close said circuit and thereby effect the operation of said brake applying means, a normally closed switch in said circuit and a connection between one side of said switch and one pole of the ignition switch, said normally closed switch being opened upon the operation of said brake applying means, and thereby breaking the ignition circuit, a manually operable switch connected in said circuit to close the circuit independently of the bumper actuated switch, a second normally closed switch interposed in said circuit between the connections with said manually operable switch and the bumper switch and adapted to be opened to cut the bumper actuated switch out of the circuit, and a connection in said circuit between said manually operable switch and the last named normally closed switch and one side of the circuit of the horn or other signal device of the vehicle whereby said signal device will be operated when the first circuit is closed by either the bumper actuated switch or said manually operated switch.

In testimony that we claim the foregoing as our invention, we have signed our names hereto.

BROR MAX SCHAUMAN.
JOHN FRANCIS MILLIGAN.